United States Patent
Neill et al.

(10) Patent No.: US 9,121,119 B2
(45) Date of Patent: *Sep. 1, 2015

(54) PARTIAL REVOCATION LIST

(75) Inventors: Brian Neill, Burlington (CA); Ashok Vadekar, Rockwood (CA)

(73) Assignee: Certicom Corp., Mississauga, Ontario (CA)

( * ) Notice: Subject to any disclaimer, the term of this patent is extended or adjusted under 35 U.S.C. 154(b) by 990 days.

This patent is subject to a terminal disclaimer.

(21) Appl. No.: 12/859,032

(22) Filed: Aug. 18, 2010

(65) Prior Publication Data

US 2010/0312791 A1    Dec. 9, 2010

Related U.S. Application Data

(63) Continuation of application No. 11/304,825, filed on Dec. 16, 2005, now Pat. No. 7,801,869.

(60) Provisional application No. 60/637,756, filed on Dec. 22, 2004.

(51) Int. Cl.
| | |
|---|---|
| *H04L 29/06* | (2006.01) |
| *D04H 13/00* | (2006.01) |
| *G06F 21/62* | (2013.01) |
| *G06F 21/64* | (2013.01) |
| *G06F 21/70* | (2013.01) |
| *G06F 21/84* | (2013.01) |
| *G11B 20/00* | (2006.01) |

(52) U.S. Cl.
CPC .......... *D04H 13/003* (2013.01); *G06F 21/6209* (2013.01); *G06F 21/64* (2013.01); *G06F 21/70* (2013.01); *G06F 21/84* (2013.01); *G06F 2221/2101* (2013.01); *G06F 2221/2129* (2013.01); *G11B 20/0021* (2013.01)

(58) Field of Classification Search
CPC ................... H04N 21/2585; H04N 21/25858; H04N 21/443; H04N 21/8166; G06F 2221/0771; H04L 9/0891; H04L 9/3268
See application file for complete search history.

(56) References Cited

U.S. PATENT DOCUMENTS

| | | | |
|---|---|---|---|
| 5,687,235 A | 11/1997 | Perlman et al. | |
| 5,812,662 A | 9/1998 | Hsu et al. | |
| 5,949,877 A | 9/1999 | Traw et al. | |
| 6,097,811 A * | 8/2000 | Micali ........................... | 713/186 |

(Continued)

FOREIGN PATENT DOCUMENTS

| | | |
|---|---|---|
| EP | 0930556 A2 | 7/1999 |
| WO | WO 01/11819 A1 | 2/2001 |

(Continued)

*Primary Examiner* — Augustine K Obisesan
(74) *Attorney, Agent, or Firm* — Jon Gibbons; Fleit Gibbons Gutman Bongini & Bianco P.L.

(57) ABSTRACT

A partial revocation list and a system and method for using the partial revocation list for tracking the authenticity of replacement cartridges in a manufactured device to inhibit cloning of the cartridges is provided. A revocation pool is maintained by a manufacturer who chooses a partial revocation list from the revocation pool to store in the memory of the cartridge. The device stores its own revocation list, informs the manufacturer of cartridges which have been used and checks when a new device is installed to ensure a cloned replacement is not being used. The partial revocation list distributes enough revocation information to devices to statistically impair the cartridge yield of a cloning operation.

30 Claims, 2 Drawing Sheets

(56) References Cited

U.S. PATENT DOCUMENTS

| | | |
|---|---|---|
| 6,748,531 B1 * | 6/2004 | Epstein .................. 713/158 |
| 6,850,914 B1 | 2/2005 | Harada et al. |
| 7,085,929 B1 | 8/2006 | Staring |
| 7,260,715 B1 * | 8/2007 | Pasieka .................. 713/158 |
| 2001/0021255 A1 | 9/2001 | Ishibashi |
| 2002/0169971 A1 | 11/2002 | Asano et al. |
| 2003/0046536 A1 | 3/2003 | Bruekers et al. |
| 2003/0051151 A1 * | 3/2003 | Asano et al. .................. 713/193 |
| 2003/0065927 A1 | 4/2003 | Penner |
| 2004/0003239 A1 * | 1/2004 | Ohmori et al. ............... 713/158 |
| 2004/0128504 A1 | 7/2004 | Kivinen et al. |
| 2004/0162985 A1 | 8/2004 | Freeman et al. |
| 2004/0168056 A1 | 8/2004 | Dillaway et al. |
| 2004/0205345 A1 | 10/2004 | Ripley et al. |
| 2004/0210597 A1 | 10/2004 | Wanish |
| 2005/0021942 A1 * | 1/2005 | Diehl et al. .................. 713/158 |
| 2006/0015937 A1 * | 1/2006 | Illowsky et al. ................ 726/18 |
| 2006/0062073 A1 | 3/2006 | Kitani et al. |
| 2006/0271492 A1 | 11/2006 | Candelore et al. |
| 2007/0016784 A1 * | 1/2007 | Vauclair ..................... 713/176 |

FOREIGN PATENT DOCUMENTS

| | | |
|---|---|---|
| WO | WO 2004/064060 A2 | 7/2004 |
| WO | WO 2004/097606 A1 | 11/2004 |

* cited by examiner

PARTIAL REVOCATION LIST

CROSS-REFERENCE TO RELATED APPLICATIONS

This application is a continuation of U.S. patent application Ser. No. 11/304,825, filed on Dec. 16, 2005, which claims priority from U.S. Provisional Patent Application No. 60/637,756 filed on Dec. 22, 2004, both of which are incorporated herein by reference.

FIELD OF THE INVENTION

The present invention relates to systems and methods for tracking the authenticity of a portion of a product.

DESCRIPTION OF THE PRIOR ART

A common business model for selling certain devices is to initially sell the complete device or system at a price that is not beneficial to the seller and reclaim lost profits by supplying parts and services on the ongoing operation of the device following the initial sale. In such a business model, poor revenues on the sale are offset by price premiums on aftermarket parts and services, allowing customers to shift their costs from large start-up costs to slightly increased, ongoing operational costs.

Typically, replacement parts are not as complicated to manufacture as the complete device. The number of suppliers capable of producing the parts is larger than the number of suppliers that can produce the more complicated device in its entirety. Hence, generic parts manufacturers will sometimes enter the market and compete directly with the original manufacturer, thereby diminishing the price premiums. Anything that the original manufacturer does to reduce the pool of capable suppliers is sometimes referred to as a "barrier to market entry".

Fundamentally, this is not a problem, and is considered a natural part of economics and commerce. A problem does arise for manufactures of computer systems, or other devices that rely heavily on a computational core to their products. Often replacement portions or parts of a device, also known as "cartridges", require a replacement cost that reflects the initial investment made in the design and production of the product as opposed to simply the cost of the materials used in their manufacture. While the original suppliers can define and create the original content of a cartridge, a much larger group can take the cartridge and "clone" it. That is, they can avoid the costs associated with creating the inherent attributes on the cartridge such as its shape, strength, functionality, and focus solely on the material manufacture, thereby benefiting from the innovation of the original manufacturer, at a loss to the latter.

By way of example, the cartridge may contain ink for a printer or may be a disposable medical device. In either case, the benefit of the innovation is taken from the manufacturer by a generic part builder that reproduces the unsophisticated physical mechanism and clones the sophisticated and valuable data contained in the product simply by copying the product.

The provision of generic parts is also of concern where the parts are used in critical environments, such as a vehicle or operating plant. The replacement of a part with a counterfeit or remanufactured part that appears to be original may lead to premature failure.

Some original manufacturers attempt to combat this situation using a combination of unique numbering of the cartridges and cryptographic controls. Digitally signing unique serial numbers, and using a communication channel to disseminate used cartridge data is the ideal solution to ensure that a cartridge was legitimately produced by the manufacturer or licensed affiliate. The signature ensures the authenticity of the serial number and the network is used to ensure only one node, or device, will use a cartridge only once.

Unfortunately, an ideal communication channel for disseminating information associated with used cartridges to other devices is rare. An ideal channel must have some degree of guaranteed availability that cannot be blocked, either intentionally or unintentionally by the user.

The only channel which can reasonably be assumed to be guaranteed available is the one realized on the physical medium of new cartridges from the manufacturer. The manufacturer can store a list of previously-employed serial numbers on a memory device on each new cartridge along with any operational data required. This list is essentially a revocation list that can be transferred to and stored on the device.

In practice, it is highly unlikely that the cartridge will contain enough space to maintain an ever-increasing revocation list. Eventually, available space on the cartridge will run out and serial numbers of cloned cartridges will not be stored. Therefore a limitation of bandwidth on the communication channel inhibits the use of a complete revocation list.

It is therefore an object of the present invention to obviate or mitigate the above-mentioned disadvantages.

SUMMARY OF THE INVENTION

In one aspect, a method is provided for monitoring replaceable portions of a device, the replaceable portions each having a unique identifier associated therewith. The method comprises the steps of storing on a new portion, a partial list of the identifiers, the partial list being chosen from a master list of the identifiers; upon installation of the new portion, the device using the contents of the partial list to update a locally stored list of identifiers; and the device comparing the identifier associated with the new portion with the locally stored list, and rejecting the installation if the identifier associated with the new portion is found.

In another aspect, a system is provided for monitoring replaceable portions of a device, the replaceable portions each having a unique identifier associated therewith. The system comprises a master list of the identifiers; and a partial list of the identifiers to be stored on a new portion, the partial list being chosen from the master list; wherein the contents of the partial list is used by the device upon installation of the new portion to update a locally stored list of identifiers and to compare the identifier associated with the new portion with the locally stored list, whereby the installation is rejected if the identifier associated with the new portion is found.

In yet another aspect, a partial revocation list is provided for use in monitoring replaceable portions of a device, and for storing on a new portion to be installed in the device, the replaceable portions each having a unique identifier associated therewith. The revocation list comprises a partial list of identifiers chosen from a master list; wherein the contents of the partial list is used by the device upon installation of the new portion to update a locally stored list of identifiers and to compare the identifier associated with the new portion with the locally stored list, whereby the installation is rejected if the identifier associated with the new portion is found.

BRIEF DESCRIPTION OF THE DRAWINGS

An embodiment of the invention will now be described by way of example only with reference to the appended drawings wherein.

DETAILED DESCRIPTION OF THE INVENTION

Figure 1:
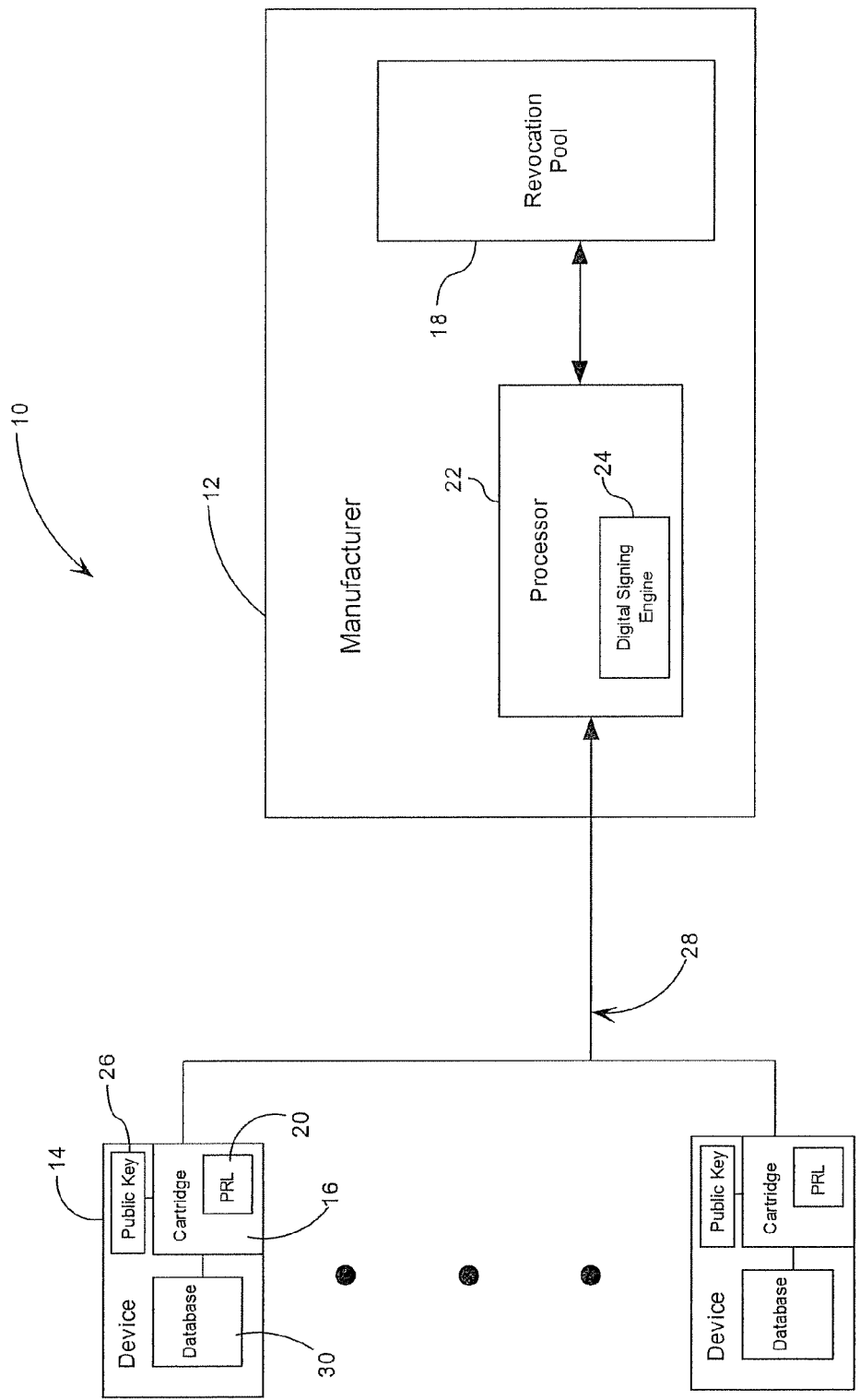
FIG. 1 is a schematic representation of a system incorporating a partial revocation list.

Referring therefore to FIG. 1, a partial revocation communication system is generally denoted by numeral 10. A manufacturer 12 produces a device 14 which has a replaceable portion referred to hereinafter as a cartridge 16. The cartridge 16 is a replaceable portion of the device 14 specifically designed to cooperate with the device 14 and by its nature can be replicated or "cloned" by an outside manufacturer. Each of the cartridges has a serial number or identifier and the manufacturer 12 maintains a master list/database of serial numbers belonging to cartridges that are known to have been used or compromised, referred to hereinafter as a revocation pool 18.

The revocation pool 18 may be generated from serial numbers, and can act as a memory device for storing information related to cartridges 16 that are known to be actively cloned by an outside manufacturer. The list may also include serial numbers from cartridges 16 manufactured prior to a past date representing the typical shelf life of the original product. In this way, the revocation list may contain identifiers of cartridges that are most likely to be cloned or recycled.

Each cartridge 16 produced by the manufacturer 12 has a partial revocation list (PRL) 20 that is created from a selection of serial numbers from the list stored in the revocation pool 18, and is stored on a memory device thereof. The content of PRL 20 may vary from one cartridge to another and offers flexibility to meet particular demands. Each cartridge 16 produced can have a PRL 20 that contains a completely different data set (i.e. each PRL 20 on a new cartridge 16 revokes a different set of used or compromised cartridges).

The contents of the PRL are determined by the manufacturer 12 who has a processor 22 for selecting a list of serial numbers from the revocation pool 18 to create the PRL 20. The processor incorporates a digital signing engine 24 used by the processor 22 for digitally signing the PRL 20 when it is created. The processor 22 is any device capable of computation. The digital signature is used to protect the information contained in the PRL 20 and can be verified using a public key 26 embedded on each of the devices 14. The public key 26 is embedded in all devices 14 so that any device 14 may validate a PRL 20 from the manufacturer 12.

The device 14 also maintains a local database 30. The database 30 contains a list of serial numbers from cartridges 16 which have been used for the device 14 and a list of revoked serial numbers which is updated using the PRL 20 of a newly installed cartridge 16.

The communication channel 28 connects the devices 16 to the manufacturer 12. In a preferred arrangement, the communication channel 28 is a trusted channel, and may be referred to as a "trusted back-channel". Such a trusted channel allows the devices to securely communicate used cartridge 16 data back to the manufacturer 12. In this preferred arrangement, the term "trusted" indicates that means have been employed by the system 10 to prevent an outside manufacturer (e.g. cloning operation) from hijacking the channel for the purposes of filtering used cartridge information, and thus hide a cloning operation. The communication channel 28 may be implemented manually using physical collection and delivery of the data but may also be done electronically with trusted hardware using an untrusted communication channel.

Figure 2:
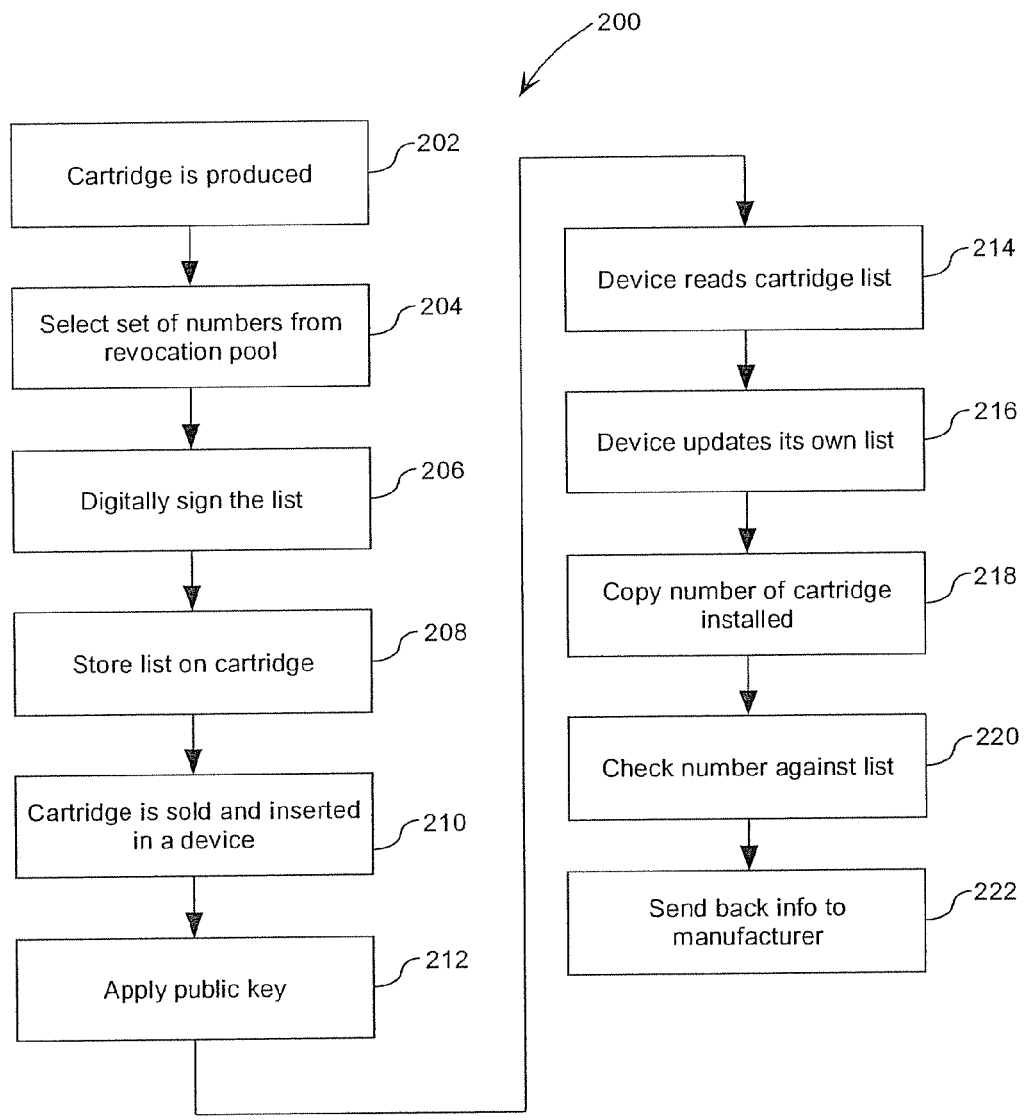
FIG. 2 is a flow chart showing the steps in a procedure for distributing and updating a partial revocation list.

To illustrate a method for utilizing a PRL 20, a distribution and updating procedure 200 is shown in FIG. 2. A cartridge 16 is produced by the manufacturer 12 at step 202. When the cartridge 16 is produced, a PRL 20 is created at step 204. The PRL 20 is created by selecting a set of serial numbers from the revocation pool 18. The choice of which serial numbers are placed in the PRL 20 is preferably based on random selection, with weighting. A manufacturer 12 is able to weight a particular selection, to improve the probability that the selection will be included in the PRL 20. A selection can represent any individual used cartridge 16 or a range of used cartridges, identified by a wild card or logic statement. A manufacturer 12 has complete control of what cartridge identifiers, if any, are present in the revocation pool 18 at any given time.

For example, a "selection" may be defined to be the tuple (serial number, weight) or (serial number range, weight), where the weight is a value between 1 and 10. For example, if a manufacturer's revocation pool 18 were to contain three such tuples, namely A=(1,1), B=(2,1) and C=(3<serial number<10, 2), and if a PRL 20 were to be populated with one selection from the pool 18, then the revocation pool 18 from which to choose, due to the weightings, would effectively be A, B, C, C, since C has a weighting of two (2). In such an example, a random selection of 100 PRLs from this particular pool would produce a PRL 20 consisting of the serial number 1 with a 25% probability, the serial number 2 with a 25% probability and the range of serial numbers from 3 to 10 with a 50% probability.

Once the PRL 20 is created, it may be signed at step 206 and then stored in non-volatile memory on the cartridge 16 at step 208. Tampering with the signed cartridge data by the customer, such as attempting to alter or strip the PRL 20 from the cartridge 16 would invalidate the digital signature. If the digital signature is invalidated, then the authenticity of the cartridge can not be verified by the device 14 because an unaltered PRL 20 would be needed to validate the digital signature.

If simply signing the PRL 20 is not sufficient, it may be combined with the serial number and then signed so that the PRL 20 can not be stripped off. The PRL 20 is associated with a particular cartridge 16, and as a result, the manufacturer 12 may encourage delivery of the PRL 20 within its respective cartridge 16, since the PRL 20 and cartridge are preferably bound together by the digital signature. Although this does not prevent the outside manufacturer from copying the serial number along with the PRL 20 and mass producing one copy, it does allow the manufacturer 12 to deal with the issue of future cartridges 16 being employed based on a reused PRL. This implies a high cartridge turnover using one-time use cartridges. Manufacturers 12 in markets such as those for printer cartridges and medical instruments with one-time use would benefit from the coupling of the important data and the PRL 20.

Any device 14 incorporating a replaceable cartridge 16 which can be readily cloned by an outside manufacturer is suitable for integrating a PRL 20 into the memory of the cartridge 16. At a time when a replacement cartridge 16 is needed to continue operation of the device 14, a replacement cartridge 16 is sold to the owner of the device 14 and inserted into the device 14 at step 210.

At the time of installation it would be preferable for the device 14 to validate the PRL 20 of the cartridge 16 using the public key 26 embedded in the device 14 as indicated in step 212. The use of the public key 26 is an optional step depending on whether or not a digital signature is used and may be done at anytime during the procedure 200 once the cartridge 16 has been installed. It is then preferable that the device 14 recognize that a new cartridge 16 has been inserted and reads the new cartridge's PRL 20 as indicated in step 214. The device will then update its list of revoked serial numbers 216 stored in its database 30 with the list of revoked serial numbers on the PRL 20.

The device 14 will then copy the serial number of the cartridge 16 being installed into its locally stored list of used serial numbers contained in its database 30 as indicated in step 218. This number is checked against both the used and revoked cartridge lists in the database 30 to ensure that the cartridge 16 being installed does not have a serial number that has been revoked or previously used at step 220. It is the device's responsibility to perform these checks and to not accept a cartridge having a previously used or revoked serial number. Thus, the operation of the device is inhibited.

In using the PRL 20, the goal is to distribute enough revocation information to the devices 14 using the replacement cartridges 16 to statistically impair the cartridge yield of an outside manufacturer who may try to clone the cartridges 16. Therefore a cloning operation may fail to deliver a working cartridge to a customer some percentage of the time. An intelligent selection process for choosing the members of the PRL 20 from the revocation pool 18 based on, e.g., a weighted selection process as outlined above, increases the likelihood that cloned cartridges will be rejected.

Preferably, a PRL 20 is intended to be used when a forward channel from the manufacturer 12 to the device 14 does not exist or is unreliable. In this case, the manufacture 12 can only guarantee to get revocation data to a device 14 if it is sent with the cartridges 16 that are required for continued operation. This will occur for example when genuine cartridges are inter mingled with cloned or recycled cartridges in the supply chain so there is a reasonable likelihood that a cartridge with an updated PRL will be installed on the device 14. The PRL 20 is preferably bound with the important data on the cartridge 16 using a digital signature so that the customer may be forced to accept and forward to the device 14, both the data and the PRL 20 on the cartridge 16.

Mass-produced cartridges 16 will most likely have an upper bound on memory, therefore sending a complete list, while preferable from a security perspective, is not possible as the list grows in size. If the entire list cannot be sent, pieces of the list can be sent to different customers so that an outside manufacturer can not be sure what cloned cartridges will work for which customers. As a result, the outside manufacture will generally have reduced yields, a less reliable product, and higher distribution costs than the manufacturer 12.

The device 14 will preferably send back an updated list of the cartridge serial numbers used by the device 14 through the communication channel 28 upon successful installation of the new cartridge 16 to the manufacturer 12 as indicated in step 222. This will enable the processor 20 to continually update the revocation pool 18 for the future generations of PRLs. It will be appreciated that step 222 as exemplified is only a preferable mechanism to determine when a cartridge 16 is used. For example, the cartridges 16 may instead employ an expiry date.

Although the invention has been described with reference to certain specific embodiments, various modifications thereof will be apparent to those skilled in the art without departing from the spirit and scope of the invention as outlined in the claims appended hereto.

The invention claimed is:

1. A method for monitoring replaceable portions of a device, each replaceable portion having a respective unique identifier associated therewith, said method comprising:

said device obtaining from a new portion, a partial list of revoked unique identifiers and a digital signature stored thereon, said partial list having been chosen from a master list of revoked unique identifiers, wherein said digital signature is generated by digitally signing a combination of said partial list and said respective unique identifier associated with said new portion, and wherein said digital signature binds said partial list to said new portion;

said device verifying said digital signature; and if said digital signature is verified, said device comparing said respective unique identifier associated with said new portion with identifiers in a locally stored list of revoked identifiers and with identifiers in said partial list, and rejecting incorporation of said new portion if said comparing reveals a match.

2. The method according to claim 1, wherein said partial list is chosen from said master list at random.

3. The method according to claim 1, wherein a weight given to each of said unique identifiers in said master list dictates the likelihood of said identifier being chosen from said master list.

4. The method according to claim 1 further comprising said device updating said locally stored list using said partial list and said respective unique identifier associated with said new portion.

5. The method according to claim 4, wherein said updating comprises replacing said locally stored list with said partial list and said unique identifier associated with said new portion.

6. The method according to claim 4, wherein said updating comprises adding said partial list and said respective unique identifier associated with said new portion to said locally stored list.

7. The method according to claim 1 further comprising said device providing said respective unique identifier associated with said new portion to another entity responsible for maintaining said master list to update said master list.

8. The method according to claim 7, wherein said providing said respective unique identifier associated with said new portion is performed using a trusted channel.

9. The method according to claim 1 further comprising said device using a locally stored public key to verify said digital signature.

10. A system for monitoring replaceable portions of a device, each replaceable portion having a respective unique identifier associated therewith, said system comprising:

an interface for obtaining from a new portion, a partial list of revoked unique identifiers and a digital signature stored thereon, said partial list having been chosen from a master list of revoked unique identifiers, wherein said digital signature is generated by digitally signing a combination of said partial list and said respective unique identifier associated with said new portion, and wherein said digital signature binds said partial list to said new portion; and a computing device operable to verify said digital signature, said computing device comprising a processor and memory storing computer executable instructions, wherein if said digital signature is verified, said computing device is operable to have said processor execute said computer executable instructions to compare said respective unique identifier associated with said new portion with identifiers in a locally stored list of revoked identifiers available to said computing device and with identifiers in said partial list, and reject incorporation of said new portion if said comparing reveals a match.

11. The system according to claim 10, wherein said partial list is chosen from said master list at random.

12. The system according to claim 10, wherein a weight given to each of said unique identifiers in said master list dictates the likelihood of said identifier being chosen from said master list.

13. The system according to claim 10, wherein said computing device is further operable to update said locally stored list using said partial list and said respective unique identifier associated with said new portion.

14. The system according to claim 13, wherein said computing device updates said locally stored list by replacing said locally stored list with said partial list and said unique identifier associated with said new portion.

15. The system according to claim 13, wherein said computing device updates said locally stored list by adding said partial list and said respective unique identifier associated with said new portion to said locally stored list.

16. The system according to claim 10, wherein the computing device is further operable to provide said respective unique identifier associated with said new portion to another entity responsible to maintain said master list to update said master list.

17. The system according to claim 16, wherein the computing device provides said respective unique identifier associated with said new portion using a trusted channel.

18. The system according to claim 10, wherein the computing device is further operable to use a locally stored public key to verify said digital signature.

19. A method for enabling replaceable portions of a device to be monitored, each replaceable portion having a respective unique identifier associated therewith, said method comprising:
   choosing a partial list of revoked unique identifiers from a master list of revoked unique identifiers for a new portion;
   digitally signing at least said partial list, wherein said digital signature binds said partial list to said new portion, and wherein said digital signature is generated by digitally signing a combination of said partial list and said respective unique identifier associated with said new portion; and
   storing said digital signature and said partial list of unique identifiers on said new portion;
   wherein the device rejects incorporation of said new portion if a verification of said digital signature fails or if a comparing of said respective unique identifier associated with said new portion with identifiers in a locally stored list of revoked identifiers available to the device and with identifiers in said partial list reveals a match.

20. The method according to claim 19, wherein said partial list is chosen from said master list at random.

21. The method according to claim 19, wherein a weight given to each of said unique identifiers in said master list dictates the likelihood of said identifier being chosen from said master list.

22. The method according to claim 19 further comprising obtaining said respective unique identifier associated with said new portion from said device and updating said master list.

23. The method according to claim 22, wherein said obtaining said respective unique identifier associated with said new portion is performed using a trusted channel.

24. The method according to claim 19 wherein said digital signature is verifiable using a public key.

25. A system for enabling replaceable portions of a device to be monitored, each replaceable portion having a respective unique identifier associated therewith, said system comprising:
   a computing device comprising a processor and memory storing computer executable instructions, wherein said processor executing said computer executable instructions causes said computing device to be: operable to choose a partial list of revoked unique identifiers from a master list of revoked unique identifiers for a new portion, operable to digitally sign at least said partial list, wherein said digital signature binds said partial list to said new portion, and wherein said digital signature is generated by digitally signing a combination of said partial list and said respective unique identifier associated with said new portion; and operable to store said digital signature and said partial list of unique identifiers on said new portion;
   wherein the computing device rejects incorporation of said new portion if a verification of said digital signature by said computing device fails, or if a comparing of said respective unique identifier associated with said new portion with identifiers in a locally stored list of revoked identifiers available to the device and with identifiers in said partial list reveals a match.

26. The system according to claim 25, wherein said partial list is chosen from said master list at random.

27. The system according to claim 25, wherein a weight given to each of said unique identifiers in said master list dictates the likelihood of said identifier being chosen from said master list.

28. The system according to claim 25, wherein the computing device is further operable to obtain said respective unique identifier associated with said new portion from said device and update said master list.

29. The system according to claim 28, wherein the computing device obtains said respective unique identifier associated with said new portion using a trusted channel.

30. The system according to claim 25, wherein said digital signature is verifiable using a public key.

* * * * *